Jan. 20, 1959    W. W. SCHROEDTER ET AL    2,869,519
METHOD OF OPERATING A WAISTLINE VAPOR GENERATOR
Filed Sept. 7, 1955
Fig. 1.
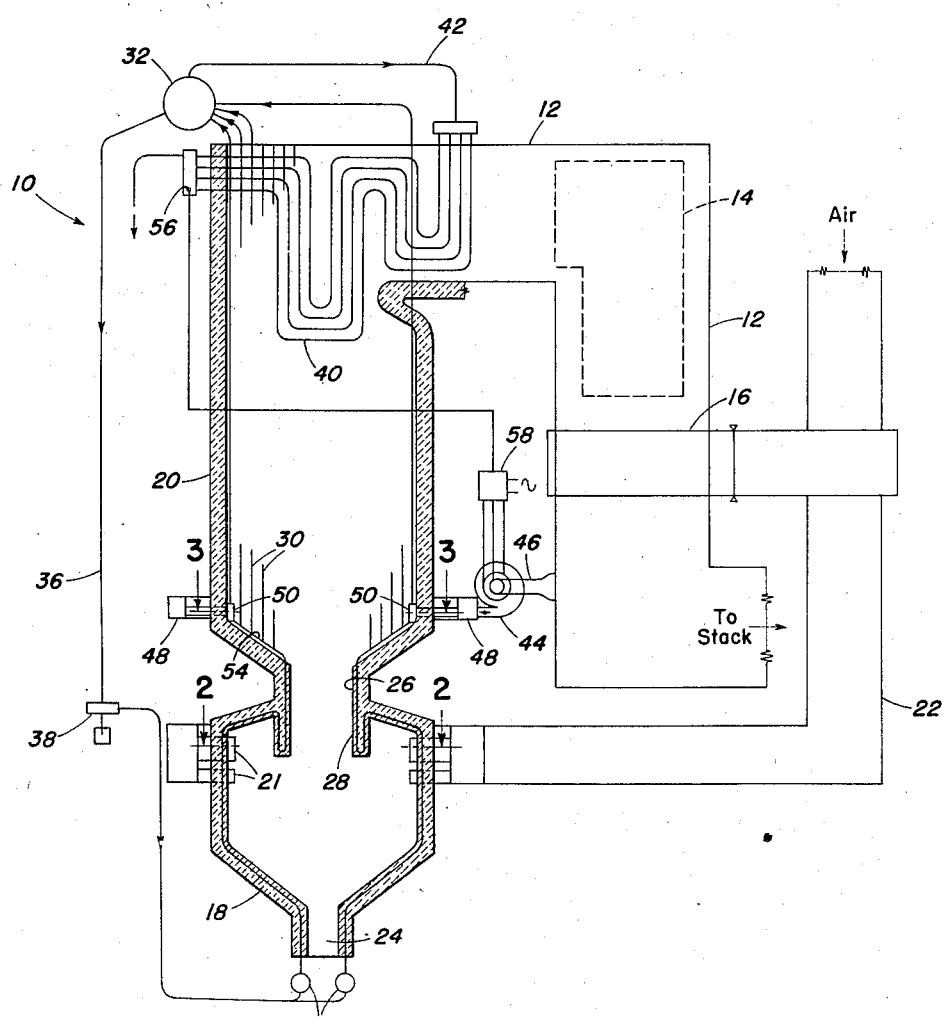
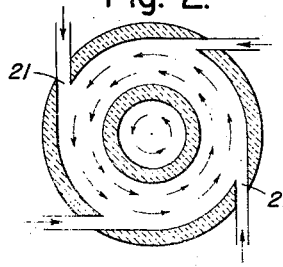
Fig. 2.
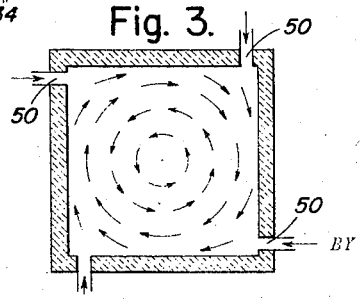
Fig. 3.
INVENTORS
Willburt W. Schroedter
Elno M. Powell
BY Eldon H. Luther
ATTORNEY United States Patent Office 2,869,519
Patented Jan. 20, 1959

2,869,519

METHOD OF OPERATING A WAISTLINE VAPOR GENERATOR

Willburt W. Schroedter, Long Island, and Elno M. Powell, Chappaqua, N. Y., assignors to Combustion Engineering, Inc., New York, N. Y., a corporation of Delaware Application September 7, 1955, Serial No. 532,877

3 Claims. (Cl. 122—478)

This invention relates to a vapor generator and particularly to a method of operating a vapor generator having a furnace of the waistline type.

In vapor generators having a so-called waistline furnace, the furnace is formed of two coaxial upright portions the lower of which is a cyclone combustion chamber into which a slag forming fuel is fired tangentially to create a whirling motion and the upper of which is a radiant portion into which combustion gases from the cyclone portion enter in a spiralling fashion and which has the inner surface of its walls lined with heat absorption tubes. Combustion of the fuel is completed in the cyclone portion and because of its relatively small volume and the high heat release obtained therewithin the temperature produced is quite high and is well above the melting point of the slag. As a result of the whirling motion this molten slag is separated by centrifugal force being thrown outwardly against the walls of the cyclone and flowing down these walls to the slag opening in the bottom of the cyclone portion. A vortex is formed by the combustion gases centrally within the cyclone portion with these gases spiralling out through a centrally disposed opening of restricted cross section in the upper end of the cyclone and into the radiant portion located immediately above the cyclone portion. These gases which contain a minor amount of molten slag, pass upwardly through this furnace portion imparting heat to the vapor generating tubes that line the walls of this radiant furnace portion with the gases then passing over a superheater for superheating the vapor generated in these vapor generating tubes.

In accordance with the present invention there is provided a novel method of operating such a vapor generator having a waistline furnace with this improved method obviating certain difficulties heretofore experienced in the operation of these furnaces as well as increasing the efficiency of operation and maintaining the superheated vapor temperature constant over a substantial load range. In accordance with the invention cooled combustion gases are introduced into the combustion gases leaving the cyclone furnace generally at a location at the bottom of the radiant furnace. These gases are directed counter-current to the spiralling combustion gas stream from the cyclone combustion chamber in order to retard the rotational velocity of this stream thereby decreasing the tendency of the molten slag in this combustion gas stream to be thrown outwardly against the walls of the radiant portion and also being effective to cool this slag below its melting point. The introduction into the radiant portion of the furnace of the cooled combustion gases is controlled in accordance with the temperature of the vapor leaving the vapor heater so as to maintain this temperature substantially constant over a predetermined load range, with the vapor generator being so designed that at maximum load sufficient of these cooled combustion gases will be introduced so that there will be little or no slag deposit on the walls of this radiant furnace portion and with the quantity of these cooled combustion gases introduced into the radiant furnace portion being increased as the load decreases in order to maintain the vapor temperature constant.

It is an object of this invention to provide an improved method of operating a vapor generator provided with a waistline furnace, which method involves the recirculation of combustion gases in such a manner as to substantially insure that the walls of the radiant furnace portion are maintained free of ash or slag deposits and to maintain the temperature of the superheated vapor produced by the vapor generator substantially constant.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

Figure 1 is a vertical sectional view, somewhat diagrammatic, of a vapor generator having a waistline furnace and constructed and arranged for performance of the improved method of this invention.

Figure 2 is a sectional view through the cyclone portion of the furnace of the vapor generator of Fig. 1 and is taken generally along line 2—2 of Fig. 1.

Figure 3 is a sectional view through the radiant portion of the furnace of the vapor generator at the location of the introduction of recirculated gas thereinto and with this sectional view being taken generally along line 3—3 of Fig. 1.

Referring now to the drawing, wherein like reference numerals are used throughout to designate like elements, there is shown a vapor generator which includes a furnace 10 within which a slag forming fuel is burned with the combustion gases passing from the upper end of this furnace through gas passageway 12 and successively over heat exchange surfaces 14 and 16, which may take the form of an economizer and an air heater respectively, with the gases then being conveyed to a suitable stack.

The furnace 10 is comprised of a cyclone combustion portion 18 and a radiant portion 20 with these two furnace portions being coaxial and with the radiant furnace portion being positioned immediately above the cyclone portion.

A slag forming fuel together with heated air are introduced into the upper end of cyclone furnace portion or cyclone combustion chamber 18 tangentially to the inner cylindrical wall of this chamber through burner means 21, with the fuel being supplied through any suitable means, not shown, and with the heated air being supplied through duct 22. At the lower end of the cyclone combustion chamber 18 is provided slag opening 24 while at the upper end of this chamber is the restricted throat 26 through which communication is had with the radiant furnace portion 20 with this throat being coaxial with both furnace portions and including a collar 28 that depends downwardly into cyclone furnace portion 18 so as to increase the efficiency of the cyclonic action in chamber 18. As is common practice, sufficient fuel is fired into the furnace to meet the load imposed on the vapor generator, i. e., maintain the pressure at which the vapor generator operates at its desired value.

The lower portion of the radiant furnace portion 20 flares outwardly, as shown, forming surfaces 54, and the inner surface of the walls of this radiant furnace portion are lined with vapor generating tubes 30 which have their upper ends connected with vapor and water drum 32 and their lower ends connected to one of the headers 34 which are in turn supplied from vapor and water drum 32 through downcomer 36 and pump 38. The lower portion of tubes 30 are preferably embedded within the refractory wall of throat 26 and cyclone furnace portion 18, as shown, to provide a cooled wall and yet protect the tubes although in some instance it may be desirable to have these tubes line the inner surface of the walls of the throat and cyclone furnace portion and omit the refractory protection for the tubes.

Positioned at the upper end of radiant furnace portion 20 and with a portion extending into passageway 12 is the superheater 40 which receives saturated vapor from vapor and water drum 32 through conduit 42 with this vapor being heated to a desired temperature and pressure upon being passed through this superheater.

In a vapor generator provided with this type of furnace, which is known in the art as a waistline furnace, there are two problems that are encountered in the operation of the vapor generator which are overcome by the method of this invention. The first of these problems is the necessity of maintaining the tubes lining the inner surface of the walls of the radiant furnace portion 20 free of slag deposits, while the second problem is the requirement of maintaining the vapor temperature leaving superheater 40 constant over a rather wide load range.

The problem of cleanliness of radiant furnace portion 20 results from the characteristic operation of the cyclone combustion portion 18. It is the function of this cyclone combustion portion of the furnace to completely burn the fuel in as small a volume, i. e., furnace volume, as possible, and at the same time remove as much fly ash from the combustion gases leaving this portion of the furnace as is possible. These results are achieved by use of the cyclone principle in a special arrangement and shape of furnace chamber. The inward protrusion of the furnace walls around their circumference at a common level to form the restricted throat 26 effectively separates the radiant furnace portion 20 from the cyclone combustion furnace portion 18 and restricts radiation from the cyclone furnace portion. This, together with the fact that the heat absorption in the tubes imbedded within the walls of cyclone furnace portion 18 is reduced because of the refractory coating and the slag flowing down the inner surface of the walls of this furnace portion results in greatly increasing the flame temperature and thereby increasing and accelerating volatilization of the fuel particles. The particular shape of chamber 18 with its lower side walls together with the tangential disposition of burners 21 results in the formation of a concentrated vortex of burning fuel and gas surrounded almost completely by walls which are covered with a fluid slag film. In this situation the larger fuel particles are retained on the slag film against the gas stream to complete combustion and the smaller particles coagulate and reach the outside film as well, with the major portion of the ash being drained off along the walls, flowing downwardly therealong through slag opening 24 and into a suitable container such as a water tank positioned therebelow, not shown in the drawings.

Although a major portion of the molten ash will be separated from the combustion gases in the cyclone portion of the furnace, a one hundred percent separation is not obtained and minor amounts of slag are conveyed with the combustion gases through throat 26 into the radiant furnace portion 20. These combustion gases and slag particles entering furnace portion 20 have a spiralling motion about the axis of this furnace portion so that their velocity has both vertical and tangential components. The size of the latter will be in direct relationship to the extent to which the function of the cyclone furnace portion is achieved, with the highest combustion rate and slag collecting efficiency requiring the strongest vortex. The resulting tangential component, expressly created for and beneficial for the function of the primary furnace, is harmful and unwanted in the secondary furnace since it will continue to centrifuge the remaining ash particles out of the combustion gas stream towards the tubes lining the walls of the radiant furnace portion. In the lower part of this radiant furnace portion these ash particles will still be molten and will deposit as a slag coating on these tubes, decreasing the efficiency of operation of the furnace and eventually causing overheating of the convection heating surfaces over which the combustion gases pass after leaving the furnace. Because of the outwardly flared portion at the lower end of radiant furnace portion 20, which forms the sloping surface 54, this problem of slag deposits is particularly acute in this type furnace since the slag will rest upon this outwardly flared wall portion which forms a shelf for slag deposits with the slag building upwardly from this shelf.

Attempts have previously been made to overcome this problem of slag deposition at the lower end of the radiant furnace portion with structural means being provided to attempt to destroy the vortex or spiralling motion of the gases entering this furnace portion from the cyclone furnace portion such as extending small walls, made of tubes, radially from throat 26 towards the center of the throat. However, such prior attempts have not been completely successful since slag deposition was not completely eliminated and the mechanical means employed was subjected to extremely severe operating conditions rendering it expensive to manufacture and costly to maintain.

In accordance with the present invention cooled combustion gases are recirculated and introduced at the bottom of furnace portion 20 and in a direction to produce a rotating gas stream counter-current to that produced by tangential fuel burners 21 in cyclone furnace portion 18. As illustratively disclosed fan 44 draws cooled combustion gases from the lower end of gas pass 12 through duct 46 and introduces the same into the annular distribution manifold 48 from which these cooled combustion gases are introduced into radiant furnace portion 20 through the tangentially arranged nozzles 50. As is evident from Figs. 2 and 3 burner means 21 introduce the fuel and air in a manner to cause rotation in a counterclockwise direction while nozzles 50 introduce the cooled combustion gases in a manner to cause rotation in the clockwise direction. The stream of cool recirculated gases will form a strong, directed and controlled barrier around the center stream of combustion gases issuing from cyclone combustion portion 18. Slag particles ejected from the center stream will be quickly cooled and arrested in their tangential movement and carried out of the furnace so that surface 54 will thus be kept free not only of molten ash deposits but also of dry ash which could form slag accumulations as it slides toward the throat opening closer to the hot gas stream. By its movement counter to the tangential component of the hot combustion gases the cool stream of recirculated gas at the same time sufficiently slows up the center vortex or rotational movement to effectively remove the cause of slag depositing in the radiant furnace portion.

In addition to eliminating the depositing of slag within the radiant furnace portion the recirculated gas is controlled in a manner to regulate the temperature of the vapor leaving vapor heater 40 so as to maintain this temperature constant over a predetermined load range of the vapor generator. Since the cyclone furnace portion of a waistline furnace is as small as possible and sitll completely burn the fuel that is introduced into it and since the walls of the cyclone furnace portion either have an inner refractory lining in addition to a molten layer of slag or at least have a molten layer of slag running downward therealong to the slag opening at the bottom of this furnace portion, this cyclone furnace portion which contains the active combustion zone represents a small percentage of the total furnace absorbing surface both in size and effectiveness. Thus, by varying the amount of cool recirculated gases introduced from nozzles 50 the absorption within the radiant portion 20 of the furnace may be varied by varying the heat available in the gases passing over the superheater 40 and accordingly providing a control for the temperature of the vapor leaving this vapor heater.

The vapor generator is designed so that at maximum load sufficient recirculated gas is introduced through nozzles 50 so as to prevent any appreciable deposition of slag upon the inner surface of radiant furnace portion 20. Then as the load on the vapor generator decreases the amount of gas that is recirculated is increased, within limits, to maintain the temperature of the vapor leaving vapor heater 40 substantially constant and at the same time maintaining the radiant furnace portion free of slag deposits. The recirculation of cooled combustion gases may be controlled in any desired manner with this control being achieved in the illustrative organization by varying the speed of recirculation fan 44 with the speed of this fan being controlled in accordance with the temperature of the vapor leaving vapor heater 40 through temperature responsive 56 which is connected to control means 58 and through which fan 44 is regulated to maintain the vapor temperature constant over a predetermined load range.

While in the illustrative organization shown in the drawing, the recirculated gas is introduced generally at the upper end of the sloping surface 54 it may be introduced at other locations, such as the top of throat 26, with it only being required that it be introduced generally at the lower end of furnace portion 20 to be effective in the manner hereinbefore described to prevent slag deposition on the walls of furnace portion 20.

Thus with the improved method of this invention a vapor generator which is provided with a furnace of the waistline type is operated so that the radiant portion of the furnace is maintained free of ash deposits or accumulations and the temperature leaving the vapor heater is maintained substantially constant over a predetermined load range.

It is to be understood that this description is intended only for the purpose of explanation and illustration and not limitation since modifications such as will occur to those skilled in the art are possible within the spirit of the invention.

What we claim is:

1. In a vapor generator comprising a furnace having a cyclone combustion portion and a radiant portion in coaxial relation, with a restricted centrally disposed combustion gas outlet of the cyclone combustion portion leading directly into the radiant portion which has its combustion gas outlet remote from said cyclone combustion portion, the inner surface of the walls of said radiant portion being lined with vapor generating tubes, and a vapor heater subjected to the combustion gases that pass through said radiant furnace portion, the method of operation comprising injecting a slag forming fuel and air tangentially into said cyclone portion so as to create a whirling mass, burning said fuel within said cyclone portion and creating a temperature sufficient to melt the slag therein with a major portion of the molten slag being separated from the combustion gases by centrifugal force and with the combustion gases together with minor amounts of molten slag passing through the restricted centrally disposed outlet of the cyclone portion into the radiant portion spiralling about the axis thereof, introducing cooled combustion gases into this gas stream adjacent the location of the introduction thereof into the radiant furnace portion and in a direction counter-current thereto and at the outer region thereof thereby surrounding the stream of gases issuing from the cyclone furnace portion with a barrier of cool counter-rotating gases, introducing sufficient of these cooled gases at maximum load to sufficiently cool molten slag particles entering the radiant furnace portion to maintain the walls of the radiant portion of the furnace substantially free of molten slag deposits and entraining these cooled slag particles in the gas stream passing through the radiant furnace portion so that they are carried therewith through said radiant furnace portion and regulatingly increasing the introduction of these gases as the load decreases so as to maintain the vapor temperature leaving the vapor heater substantially constant over a predetermined load range.

2. In a vapor generator wherein a slag forming fuel is fired into the vertically disposed cyclone combustion portion of a furnace with the slag becoming molten and the combustion gases evolved together with minor portions of molten slag passing in a spiralling path from said cyclone combustion portion through a centrally disposed restricted outlet in the upper end thereof into a vertically disposed radiant portion of the furnace into which the cyclone combustion chamber opens directly and which is axially parallel with said cyclone combustion portion and has its walls lined with vapor generating tubes with these gases, and after passing through at least a substantial portion of the furnace, passing in contact with a vapor heater and thereby heating the vapor generated in said vapor generating tubes, the method of operation comprising introducing, at maximum load on the vapor generator, cooled combustion gases into said radiant furnace portion generally at the location of the ingress of combustion gases thereinto from said cyclone combustion portion and in a direction so as to retard the rotational movement of the gases entering the radiant furnace and in sufficient quantity so as to sufficiently cool said minor portions of molten slag to prevent any appreciable deposition of slag upon the inner surface of the radiant furnace portion, entraining these cooled slag portions in the gases passing through the radiant furnace portion so that they are conveyed therethrough along with the gases, regulating the rate of firing fuel into the cyclone combustion portion to meet the load imposed upon the vapor generator, and increasing the quantity of cooled combustion gases so introduced into the radiant furnace as the load decreases through a limited range of operation so as to maintain the temperature of the heated vapor substantially constant.

3. In a vapor generator wherein a slag forming fuel is fired into the vertically disposed cyclone combustion portion of a furnace with the slag becoming molten and the combustion gases evolved together with the minor portions of molten slag passing in a spiralling path from said cyclone combustion portion through a centrally disposed restricted outlet in the upper end thereof into a vertically disposed radiant portion of the furnace into which the cyclone combustion portion opens directly and which is coaxial with said cyclone combustion portion and has its walls lined with vapor generating tubes with these gases, and after passing through at least a substantial portion of the furnace, passing in contact with a vapor heater and thereby heating the vapor generated in said vapor generating tubes, reducing the rotative velocity of the gases entering the radiant furnace portion from the cyclone portion and cooling at least a substantial portion of the molten slag particles carried by said gases to a temperature below the melting point of the slag before they contact the wall tubes of said radiant portion by introducing cooled combustion gases into the stream of gas adjacent the location of passage thereof from the cyclone portion into the radiant portion and directing said cooled gases generally counter-current to these spiralling gases from the cyclone furnace portion, entraining the thus cooled slag particles in the gases passing through the radiant furnace portion so that they are carried therethrough by these gases, and regulating the introduction of said cooled gases to maintain the temperature of the heated vapor substantially constant over a substantial load range.

References Cited in the file of this patent

UNITED STATES PATENTS 2,380,169  Gygi _____ July 10, 1945

FOREIGN PATENTS 1,067,926  France _____ Feb. 3, 1954
1,075,515  France _____ Apr. 14, 1954
675,410  Great Britain _____ July 9, 1952